United States Patent Office 2,879,252
Patented Mar. 24, 1959

2,879,252

ADHESIVE COMPOSITIONS OF POLYEPOXIDE RESINS AND BUTADIENE-ACRYLONITRILE RUBBERS AND METHOD OF MAKING BRISTLE BRUSHES USING SAME

Jerome L. Been and Martin M. Grover, Rutherford, N.J., assignors to Rubber and Asbestos Corporation, Bloomfield, N.J., a corporation of New Jersey No Drawing. Application December 27, 1952
Serial No. 328,260

7 Claims. (Cl. 260—45.5)

This invention relates to novel synthetic adhesive compositions. In particular the invention relates to novel structural adhesive compositions which have both a high peel-back strength and a wide range of specific adhesion.

In the preparation of many articles of manufacture it is often desirable to unite the various components of the article with a structural adhesive. Use of structural adhesives provides for easier assembly, better compactness and greater economy as compared with mechanical joints. However, the structural adhesives as are presently available have limitations on their use. Compositions of rubber and rubber derivatives for example must be specially compounded for the specific surfaces desired, form typically inadequate bonds between non-porous surfaces, and often require special surface preparation. Previously described synthetic resin compositions that have been used as structural adhesives also have a limited range of specific adhesion, are difficult to apply, and further have a low peel-back strength. Modifications of these compositions with plasticizers and resins to improve their qualities has often made application easier but have not noticeably increased either the range of specific adhesion or the peel-back strength.

One object of this invention is to provide improved compositions of elastomers and synthetic resins.

Another object of this invention is to provide novel synthetic compositions suitable for use as structural adhesives and having a wide range of specific adhesion, a high peel-back strength and a high geometrical stability.

A further object of this invention is to provide such novel compositions as described which are thermosetting and are suitable for structural adhesive use in assembling articles having porous, non-porous and mixed surfaces.

A still further object of this invention is to provide such novel compositions as described which are suitable as improved brush setting compounds.

Yet another object of this invention is to provide such novel compositions as described which are suitable for use as improved base setting compounds in electronic vacuum tubes.

We have found that the objects of this invention are met by providing compositions containing substantial quantities of polyepoxide resins and certain synthetic elastomers. For heat-hardening compositions a proportionate quantity of polyepoxide hardening agent is added. In the case of an unsaturated elastomer a curing agent may also be added. Such compositions when applied and heated yield uniform bonding layers of unexpectedly wide specific adhesion, high film strength, high peel strength and excellent geometrical stability.

The term "polyepoxide resin" as used herein describes the polymeric reaction products of polyfunctional halohydrins such as epihalo-hydrins with polyfunctional hydrogen-donating reactants, or their salts, such as polyfunctional phenols, alcohols, amines, acids and their salts. The major reaction is presumably a splitting out of hydrogen or metal halide with simultaneous opening and reaction of the epoxy ring. The resin molecule would then contain functional hydroxy side groups, 1.2 epoxy end groups, and ethereal or ester linkages. A small proportion of hydroxy end groups are also likely to be present. Other terms often used synonomously with "polyepoxide resin" are "polymeric glycidyl ethers" and "epoxy-hydroxy polyether resins." The term "polyepoxide resin" as used herein is also intended to include glycidyl polyesters as well as glycidyl polyethers. The important common properties are the resinous character and the functional 1.2 epoxy and hydroxy groups. Polyepoxide resins are also preparable from epoxy containing compounds having a non-halide, hydrogen bonding reactive group.

A typical method of preparing a polyepoxide resin is described in United States Patent No. 2,500,449 in which epichlorohydrin is reacted with bisphenol at 100° C. in the presence of sufficient alkali to bind the hydro-chloric acid formed. The resins formed vary according to the molal proportions and reaction conditions, and have melting points ranging from 43° to 112° C. In this particular case the end groups are presumed to be epoxy groups while there are many intermediate functional hydroxy groups. Further hardening of a typical polyepoxide resin such as this is provided by heating with a hardening agent usually bi-functional which acts to cross-link the previously formed resin, e.g. oxalic acid, citric acid, inorganic bases, organic bases etc. Other polyepoxide resins and methods are described in U.S. Patents, 2,444,-333; 2,528,932; 2,500,600; 2,467,171 and others.

Polyepoxide resins are available commercially in a wide range of epoxy content, molecular weight, softening point and composition. Common sources of such commercial resins are Shell Chemicals Co. (Epon resins) and Ciba, Ltd. (Araldite resins).

Various reaction mixtures and admixtures of polyepoxide resins with other materials have been described for adhesive and coating purposes. Reactants used include phenol-aldehyde condensates, phenolic pitch (aqueous alkali extract of cracked petroleum oil), powdered alumina, drying oils, polyhydric phenols, phenol-drying-oil condensates, and alcoholic esters. However, these compositions when used with a hardening agent as structural adhesives have shown an extremely low peel strength, very poor adhesion for rubber and synthetic rubber surfaces, and a low impact strength.

The present invention is based on our discovery that polyepoxide resins when modified with butadiene-acrylonitrile copolymers and then hardened with an appropriate polyepoxide hardening agent yield an excellent structural adhesive possessing wide specific adhesion and excellent peel-back strength. When either the same polyepoxide or elastomer is heat-hardened alone the results are far inferior, especially in peel-back strength and specific adhesion. The enormous increase in peel strength and range of specific adhesion obtained from the compositions of this invention are totally unexpected and unpredictable from the properties of the individual components. The products of this invention can be used to bond steel, aluminum, nickel, rubber, nylon, tungsten, wood, glass, porcelain, brick, copper, brass, bronze and synthetic resins and plastics. Peel-back strength with these materials are over five times that of previously described structural adhesives and of either component used alone.

Normally compounded polyepoxide resins have high tensile strength, fair impact strength, fair fatigue strength, poor peel strength but very high specific adhesion except for most rubbers. Elastomers on the other hand, although having high impact, peel and fatigue strength do not bond well to non-porous surfaces. The blended combination of a polyepoxide resin and elastomer therefore would not be expected to be compatible, but even if compatible, would be expected to be intermediate in quality and lose the outstanding qualities of either component. Actually, we found this to be so for most elastomers such as natural rubber, polychloroprene, polysulfide rubbers, butadiene-styrene rubbers and polyvinyl chloride. However, polyepoxide resin blends with copolymers of acrylonitrile and butadiene, and polyvinyl-aceto-butyral, yield adhesives having a much higher peel-back strength and wider range of specific adhesion than either the resin or elastomer compounded separately. With the acrylonitrile copolymers we have found these properties particularly striking where the acrylonitrile content is in the range of 15% to 45%, and the percentage of elastomer of the combined polyepoxide-resin elastomer is between 5% and 95%.

The butadiene-acrylonitrile rubbers are vulcanizable and are commercially available under trade-marks of Hycar-OR, Chemigum, Paracril, Butaprene and Herecrol. These commercial rubbers vary in acrylonitrile content, which is determinable by Kjeldahl analysis.

This substantial increase of quality permits a wide use of these compositions as rigid structural adhesives. Rigid structural adhesives in the past have been supplemented by mechanical clamping means such as welds, rivets and bolts. This material affords for the first time a rigid structural adhesive for joining practically any type of surface including metal-metal and metal-glass without mechanical clamping.

The products of this invention may be used in widely different ways. They may be mixed with suitable extenders, inert fillers or re-inforcing fillers as well as common plasticizers and milling aids without detracting from the wide range of specific adhesion and bonding strength. These compositions may be used as casting compounds, or molding compounds, or applied to objects from solution. By suitable choice of components, fluid compositions can be obtained without the use of solvents.

Within the scope of this invention a wide range of polyepoxide resins and elastomers, with wide differences in fluidity, melting point, and composition may be used. It is obvious that a person skilled in the art could readily formulate compositions having the desired application characteristics. However, this invention may be better understood if a few detailed examples are given even though they by no means are intended to limit the scope of this invention.

In the following examples, the resins and elastomers used were obtained or prepared as follows.

BUTADIENE-ACRYLONITRILE COPOLYMER A

A rubbery copolymer was prepared by reacting at 30–40° C. an agitated emulsion of approximately 70 parts butadiene, 30 parts acrylonitrile, 0.35 parts hydrogen peroxide and 250 parts of emulsifying solution containing 2% fatty acid almost completely neutralized with alkali. After salt-acid coagulation the copolymer crumbs were filtered, washed and dried.

BUTADIENE-ACRYLONITRILE COPOLYMER A–1

Same as copolymer A, except that a redox system of catalysis is used.

HYCAR OR–25

A butadiene-acrylonitrile copolymer made by the B. F. Goodrich Chemical Co., and indicating upon Kjehldahl ammonolysis an acrylonitrile content of roughly 30%.

HYCAR OR–15

A butadiene-acrylonitrile copolymer made by the B. F. Goodrich Chemical Co., and indicating upon Kjehldahl ammonolysis an acrylonitrile content of roughly 40%.

PARACRIL 18

A butadiene-acrylonitrile copolymer made by the Naugatuck division of U.S. Rubber Co., and indicating upon Kjehldahl ammonolysis an acrylonitrile content of roughly 25%.

All these copolymers were evaluated in the formulas given below, and were found practically equivalent to the copolymers cited. Liquid copolymers were also evaluated as well as copolymer A made to 15% and to 45% acrylonitrile content and found equivalent to the single copolymer cited.

POLYEPOXIDE RESINS B, C AND D

A heated mixture of bis-phenol (bis-(4-hydroxyphenyl)-2,2 propane) with a molal excess of epichlorohydrin is kept stirred with 10% aqueous sodium hydroxide of between 1.1 and 1.3 mols per mol of bis-phenol. After refluxing for sufficient time at about 100° C. the reaction is stopped and the resin removed and purified.

With an epichlorohydrin content of 2.5 mols per mol of bisphenol, the resultant resin is resin B, having a softening point of about 25° C.

With 2.0 mols per mol of bisphenol, the resultant resin is resin C, having a softening point of about 40° C.

With 1.25 mols per mol, the resultant resin is resin D, having a softening point of about 100° C.

In the formulas listed below, various commercial polyepoxide resins were substituted and found to be equivalent as indicated.

By comparision of softening points, and by pyridinium chloride determination of 1,2 epoxy content, it was determined that Shell Chemical Co.-Epon 834 (RN 34) and 828 were equivalent to resin B, while Epon numbers 1004 to 1009 and Ciba Ltd.'s Araldite CN–501 were substantially equivalent to polyepoxide resin D. Substitution of these commercial materials and curing gave similar bonds.

HARDENING AGENT

The hardening or cross-linking of polyepoxide resins is effected by heating with compounds reactive with the hydroxy or epoxy groups. Among the hardening agents which can be used are melamine as 20/100 of resin, dicyandiamide—20/100, melamine—20/100, diallyl melamine—10/100, and diethylenetetramine—6/100.

One important use of structural adhesives is in brushes, where a brush-setting compound is used to unite the bristles with the handle. In manufacturing a conventional paint brush, the bristles plus separator sticks are packed firmly into the lower portion of a metal ferrule. The bristles are commonly hair, nylon or saran. A quantity of liquid thermosetting composition is then introduced above the bristles by means of a suitable metering pump. The composition is allowed to penetrate between the bristles by means of capillary action and gravity flow until the desired depth of penetration is obtained. The penetration is then checked by the application of heat which evaporates the solvent carrier. The brush is then placed into a curing oven and cured.

The three formulas which follow illustrate a rubber cement, a polyepoxide resin casting compound, and a blend of the two in accordance with this invention, all of which were tested as brush setting compounds.

*Formula #1*

| | Parts by weight |
|---|---|
| Butadiene - acrylonitrile copolymer A or Hycar OR–25 | 100 |
| Antioxidant | 2 |
| Barytes | 25 |
| Zinc oxide | 5 |
| Sulphur | 50 |
| Stearic acid | 1 |
| Butyraldehyde amine | 2 |
| Methyl-ethyl-ketone or ethyl acetate | 200 |

*Formula #2*

| | |
|---|---|
| Polyepoxide resin D | 100 |
| Melamine | 20 |
| Barytes | 25 |
| Methyl-ethyl-ketone | 200 |

Formula #3

| | |
|---|---|
| Butadiene-acrylonitrile polymer A | 100 |
| Antioxidant | 2 |
| Barytes | 50 |
| Zinc oxide | 5 |
| Sulphur | 50 |
| Stearic acid | 1 |
| Butyraldehyde amine accelerator | 2 |
| Methyl-ethyl-ketone | 400 |
| Polyepoxide resin D | 100 |
| Melamine | 20 |

In the case of Formula #1 it will be found that the adhesion to the ferrule of the setting is nil; that the brush contains a number of shrinkage cracks which extends down through the bristles; such a brush is not acceptable. In the case of Formula #2, it would be impossible to control the degree of penetration obtained into the bristle as the epoxide resin composition alone (without elastomer) is low in viscosity, cures slowly, and is too thermoplastic; the result will be that there will be uncontrolled resin penetration possibly all the way down to the end of the bristles. In the case of Formula #2, the adhesion to the ferrule may be excellent, but the bond will be brittle and flexing will result in immediate separation. The bond of the setting Formula #2 to synthetic bristles such as nylon will be poor.

The resulting cured brush setting using Formula #3 will be found to have excellent resistance to the solvent blends normally used in coating manufacture; to have a uniform depth of penetration across the brush; to be free from shrinkage within the ferrule, which frequently results in cracks across the setting; to have more than adequate adhesion to the bristle; to have such uniquely excellent adhesion to the ferrule that for many types of brushes the conventional rivets which hold the setting within the ferrule may be eliminated.

The composition of the Formula 3 may also be used as an adhesive for bonding metal to metal, such as 24ST3 aluminum sheet. It will be found to have a tensile shear bond strength of about 2500 pounds per square inch and a relative peel-back bond strength of about 25 to 30 units. By contrast the composition Formula 1 would be found to have a tensile shear strength of only about 500 pounds per square inch and a relative peel-back strength of 5 units; and the Formula #2 will have a tensile of 2200 p.s.i. and a relative peel-back strength of only 2 units.

Formula #4

| | Parts by weight |
|---|---|
| Copolymer A | 100 |
| Polypoxide resin B or C | 200 |
| Sulphur | 25–40 |
| Rubber accelerator | 2 |
| Dicyandiamide | 40 |
| Filler | 300 |
| Solvent (e.g. ethyl acetate) | 200 |

Using Formula 4, light contact pressure cures were made with nylon, tin and nickelplate. The bond strengths are as indicated:

Nylon to tin—80 p.s.i. stripback strength
Nylon-to-nylon—40 p.s.i. stripback strength
Tin to tin—.1500 p.s.i. shear strength
Nickelplate to nickelplate—1300 p.s.i. shear strength Using Formulas 1 and 2, with similar light contact pressure cures, little adhesion at all was found to nylon, tin or nickelplate.

Although the detailed examples set forth above deal with a few of the butadiene-acrylonitrile copolymers known and described, we have found that many other of such copolymers and resins will provide similar improved compositions when admixed with polyepoxide resins at from 5 to 95% content. It is preferred that with the copolymers that there be an acrylonitrile content of between 15 and 45%.

Likewise, although only a few polyepoxides, principally epichlorohydrin-bisphenol, where there is excess molar epichlorohydrin, has been cited in detail, we have found that any polyepoxide resin having functional epoxy and hydroxy groups will afford the substantial and marked improvement in adhesive properties described.

It should be understood that there are many varieties of materials within the scope of this invention, and that these would be apparent to a person skilled in the art.

We claim:

1. A composition of matter comprising a mixture of glycidyl polyether of a polyhydric phenol having a 1,2-epoxy equivalency greater than 1.0, and an elastomeric copolymer of butadiene and acrylonitrile containing a major proportion of butadiene in the polymer molcules.

2. The composition of claim 1 in admixture with hardening agent which normally cross-links said polyether and vulcanizing agent which normally cross-links said copolymer.

3. The composition of claim 1 dissolved in solvent.

4. A composition of matter comprising a mixture of the glycidyl polyether formed from the reaction of a molal excess of epichlorohydrin and bisphenol and an elastomeric copolymer of butadiene and acrylonitrile containing a major proportion of butadiene in the polymer molecules.

5. The composition of claim 4 dissolved in solvent.

6. A composition of matter comprising a mixture of 95% to 5% of a glycidyl polyether of a polyhydric phenol having a 1,2-epoxy equivalency greater than one and 5% to 95% of an elastomeric copolymer of butadiene and acrylonitrile containing a major portion of butadiene in the polymer molecules.

7. In a method of manufacturing a bristle brush containing a ferrule, bristles, a handle and a heat hardened bristle-binding composition, the step of using as the bristle-binding composition a composition comprising a mixture of the glycidyl polyether of a polyhydric phenol having a 1,2-epoxy equivalency greater than one and an elastomeric copolymer of butadiene and acrylonitrile containing a major proportion of butadiene in the polymer molecules.

References Cited in the file of this patent

UNITED STATES PATENTS

| | | |
|---|---|---|
| 2,190,181 | Beames | Feb. 13, 1940 |
| 2,258,361 | Hewes | Oct. 7, 1941 |
| 2,376,854 | Saunders et al. | May 22, 1945 |
| 2,422,637 | Thomas | June 17, 1947 |
| 2,506,486 | Bender et al. | May 2, 1950 |
| 2,637,621 | Auer | May 5, 1953 |
| 2,713,567 | Schiebli | July 19, 1955 |

OTHER REFERENCES

Bayes: Article in Paint, Oil and Chemical Review, Nov. 20, 1952, pages 24–26.